(12) United States Patent
Li et al.

(10) Patent No.: US 11,864,196 B2
(45) Date of Patent: Jan. 2, 2024

(54) UPLINK CONFIGURED GRANT CONFIGURATION DETERMINATION FOR A USER EQUIPMENT DEVICE

(71) Applicant: QUALCOMM Incorporated, San Diego, CA (US)

(72) Inventors: Chih-Ping Li, San Diego, CA (US); Seyedkianoush Hosseini, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/444,887

(22) Filed: Aug. 11, 2021

(65) Prior Publication Data
US 2022/0053550 A1 Feb. 17, 2022

Related U.S. Application Data

(60) Provisional application No. 63/064,805, filed on Aug. 12, 2020.

(51) Int. Cl.
| | | |
|---|---|---|
| *H04W 72/23* | (2023.01) | |
| *H04W 72/02* | (2009.01) | |
| *H04W 72/1268* | (2023.01) | |
| *H04L 5/14* | (2006.01) | |

(52) U.S. Cl.
CPC ............ *H04W 72/23* (2023.01); *H04L 5/14* (2013.01); *H04W 72/02* (2013.01); *H04W 72/1268* (2013.01)

(58) Field of Classification Search
CPC . H04W 72/23; H04W 72/02; H04W 72/1268; H04L 5/14; H04L 5/0028
See application file for complete search history.

(56) References Cited

U.S. PATENT DOCUMENTS

| | | | |
|---|---|---|---|
| 2016/0112946 A1* | 4/2016 | Yi .......................... | H04W 48/20 370/280 |
| 2019/0223195 A1* | 7/2019 | Lu ........................ | H04W 72/569 |
| 2019/0387515 A1* | 12/2019 | Stauffer ................ | H04L 5/0044 |

OTHER PUBLICATIONS

International Search Report and Written Opinion—PCT/US2021/071169—ISA/EPO—dated Jan. 24, 2022.

(Continued)

*Primary Examiner* — Chi Ho A Lee
(74) *Attorney, Agent, or Firm* — Norton Rose Fulbright US LLP

(57) ABSTRACT

A method of wireless communication includes receiving, by a user equipment (UE), a plurality of uplink configured grant (UL-CG) configurations and receiving, by the UE, an UL-CG. The method further includes selecting, based on a resource configuration associated with a slot, an UL-CG configuration from among the plurality of UL-CG configurations for an occasion of the UL-CG that is to occur during the slot. The method further includes performing an uplink transmission during the occasion of the UL-CG based on the selected UL-CG configuration.

29 Claims, 7 Drawing Sheets

700

702
Receive, by a user equipment (UE), an uplink configured grant (UL-CG) having an UL-CG configuration associated with first resources, wherein an occasion of the UL-CG is to occur during a slot 704
Receive, by the UE, a message indicating modification of resources associated with the slot from a half-duplex (HD) resource configuration to a sub-band full-duplex (SBFD) resource configuration that includes second resources associated with a downlink transmission or with a guard band 706
Based on determining that the first resources and the second resources include one or more common resources, perform, by the UE, one or more operations associated with a resource configuration of the slot

(56) References Cited

OTHER PUBLICATIONS

INTERDIGITAL: "Configured Grant Transmission in NR-U", 3GPP Draft, R2-1906404, 3GPP TSG RAN WG2 Meeting #106, (R16 NRU WI AI 11.2.1.2 Configured Grant Transmission in NR-U), 3rd Generation Partnership Project (3GPP), Mobile Competence Centre, 650, Route Des Lucioles, F-06921 Sophia-An, vol. RAN WG2, No. Reno, USA, May 13, 2019-May 17, 2019, May 13, 2019 (May 13, 2019), XP051729869, 5 Pages, Retrieved from the Internet: URL:http://www.3gpp.org/ftp/Meetings%5F3GPP%5FSYNC/RAN2/Docs/R2%2D1906404%2Ezip.

NTT Docomo, Inc: "Enhanced UL Transmission with Configured Grant for URLLC", 3GPP Draft, R1-1811380, 3GPP TSG RAN WG1 Meeting #94bis, EURLLC UL Grant-Free, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518784, 10 Pages, Retrieved from the Internet: URL:http://www.3gpp.org/ftp/tsg%5Fran/WG1%5FRL1/TSGR1%5F94b/Docs/R1%2D1811380%2Ezip.

Partial International Search Report—PCT/US2021/071169—ISA/EPO—dated Nov. 30, 2021.

\* cited by examiner

UPLINK CONFIGURED GRANT CONFIGURATION DETERMINATION FOR A USER EQUIPMENT DEVICE

CROSS-REFERENCE TO RELATED APPLICATIONS

This application claims the benefit of and priority to U.S. Prov. Pat. App. No. 63/064,805, entitled "UPLINK CONFIGURED GRANT CONFIGURATION DETERMINATION FOR A USER EQUIPMENT DEVICE" and filed on Aug. 12, 2020, which is expressly incorporated by reference herein in its entirety.

TECHNICAL FIELD

Aspects of the present disclosure relate generally to wireless communication systems, and more particularly, to determining an uplink configured grant (UL-CG) configuration for a sub-band full-duplex (SBFD) resource configuration in a wireless communication system.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, an apparatus for wireless communication includes a receiver configured to receive a plurality of uplink configured grant (UL-CG) configurations and to receive an UL-CG. The apparatus further includes a transmitter configured to perform, based on a UL-CG configuration of the plurality of UL-CG configurations, an uplink transmission during an occasion of the UL-CG. The occasion occurs during a slot, and the UL-CG configuration is selected from among the plurality of UL-CG configurations based on a resource configuration associated with the slot.

In some other aspects, a method of wireless communication includes receiving, by a user equipment (UE), a plurality of uplink configured grant (UL-CG) configurations and receiving, by the UE, an UL-CG. The method further includes selecting, based on a resource configuration associated with a slot, an UL-CG configuration from among the plurality of UL-CG configurations for an occasion of the UL-CG that is to occur during the slot. The method further includes performing an uplink transmission during the occasion of the UL-CG based on the selected UL-CG configuration.

In some other aspects, a non-transitory computer-readable medium stores instructions executable by a processor to perform operations. The operations include receiving, by a UE, a plurality of UL-CG configurations and receiving, by the UE, an UL-CG. The operations further include, based on a resource configuration associated with a slot, selecting, by the UE, an UL-CG configuration from among the plurality of UL-CG configurations for an occasion of the UL-CG that is to occur during the slot. The operations further include performing an uplink transmission during the occasion of the UL-CG based on the selected UL-CG configuration.

In some other aspects, an apparatus includes a memory and one or more processors coupled to the memory and configured to receive, by a UE, a plurality of UL-CG configurations and to receive, by the UE, an UL-CG. The one or more processors are further configured to select, based on a resource configuration associated with a slot, an UL-CG configuration from among the plurality of UL-CG configurations for an occasion of the UL-CG that is to occur during the slot. The one or more processors are further configured to perform an uplink transmission during the occasion of the UL-CG based on the selected UL-CG configuration.

In some other aspects, an apparatus includes means for receiving, by a UE, a plurality of UL-CG configurations and an UL-CG. The apparatus further includes means for selecting, based on a resource configuration associated with a slot, an UL-CG configuration from among the plurality of UL-CG configurations for an occasion of the UL-CG that is to occur during the slot. The apparatus further includes means for performing an uplink transmission during the occasion of the UL-CG based on the selected UL-CG configuration.

In some other aspects, a UE for wireless communication includes a transmitter and a receiver. The receiver is configured to receive an UL-CG having an UL-CG configuration associated with first resources. An occasion of the UL-CG is to occur during a slot. The receiver is further configured to receive a message indicating modification of resources associated with the slot from a half-duplex (HD) resource configuration to a sub-band full-duplex (SBFD) resource configuration that includes second resources associated with a downlink transmission or with a guard band. The UE is configured to perform, based on determining that the first resources and the second resources include one or more common resources, one or more operations associated with a resource configuration of the slot.

In some other aspects, a method of wireless communication includes receiving, by a UE, an UL-CG having an UL-CG configuration associated with first resources. An occasion of the UL-CG is to occur during a slot. The method further includes receiving, by the UE, a message indicating modification of resources associated with the slot from a half-duplex (HD) resource configuration to a sub-band full-duplex (SBFD) resource configuration that includes second resources associated with a downlink transmission or with a guard band. The method further includes, based on determining that the first resources and the second resources include one or more common resources, performing, by the UE, one or more operations associated with a resource configuration of the slot.

In some other aspects, a non-transitory computer-readable medium stores instructions executable by a processor to perform operations. The operations include receiving, by a UE, an UL-CG having an UL-CG configuration associated with first resources. An occasion of the UL-CG is to occur during a slot. The operations further include receiving, by the UE, a message indicating modification of resources associated with the slot from an HD resource configuration to an SBFD resource configuration that includes second resources associated with a downlink transmission or with a guard band. The operations further include, based on determining that the first resources and the second resources include one or more common resources, performing, by the UE, one or more operations associated with a resource configuration of the slot.

In some other aspects, an apparatus includes a memory and one or more processors coupled to the memory. The one or more processors are configured to receive, by a UE, an UL-CG having an UL-CG configuration associated with first resources, wherein an occasion of the UL-CG is to occur during a slot. The one or more processors are further configured to receive, by the UE, a message indicating modification of resources associated with the slot from a half-duplex (HD) resource configuration to a sub-band full-duplex (SBFD) resource configuration that includes second resources associated with a downlink transmission or with a guard band. The one or more processors are further configured to perform one or more operations associated with a resource configuration of the slot based on determining that the first resources and the second resources include one or more common resources.

In some other aspects, an apparatus includes means for receiving, by a UE, an UL-CG having an UL-CG configuration associated with first resources and for receiving a message. An occasion of the UL-CG is to occur during a slot, and the message indicates modification of resources associated with the slot from an HD resource configuration to an SBFD resource configuration that includes second resources associated with a downlink transmission or with a guard band. The apparatus further includes means for performing one or more operations associated with a resource configuration of the slot based on determining that the first resources and the second resources include one or more common resources.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
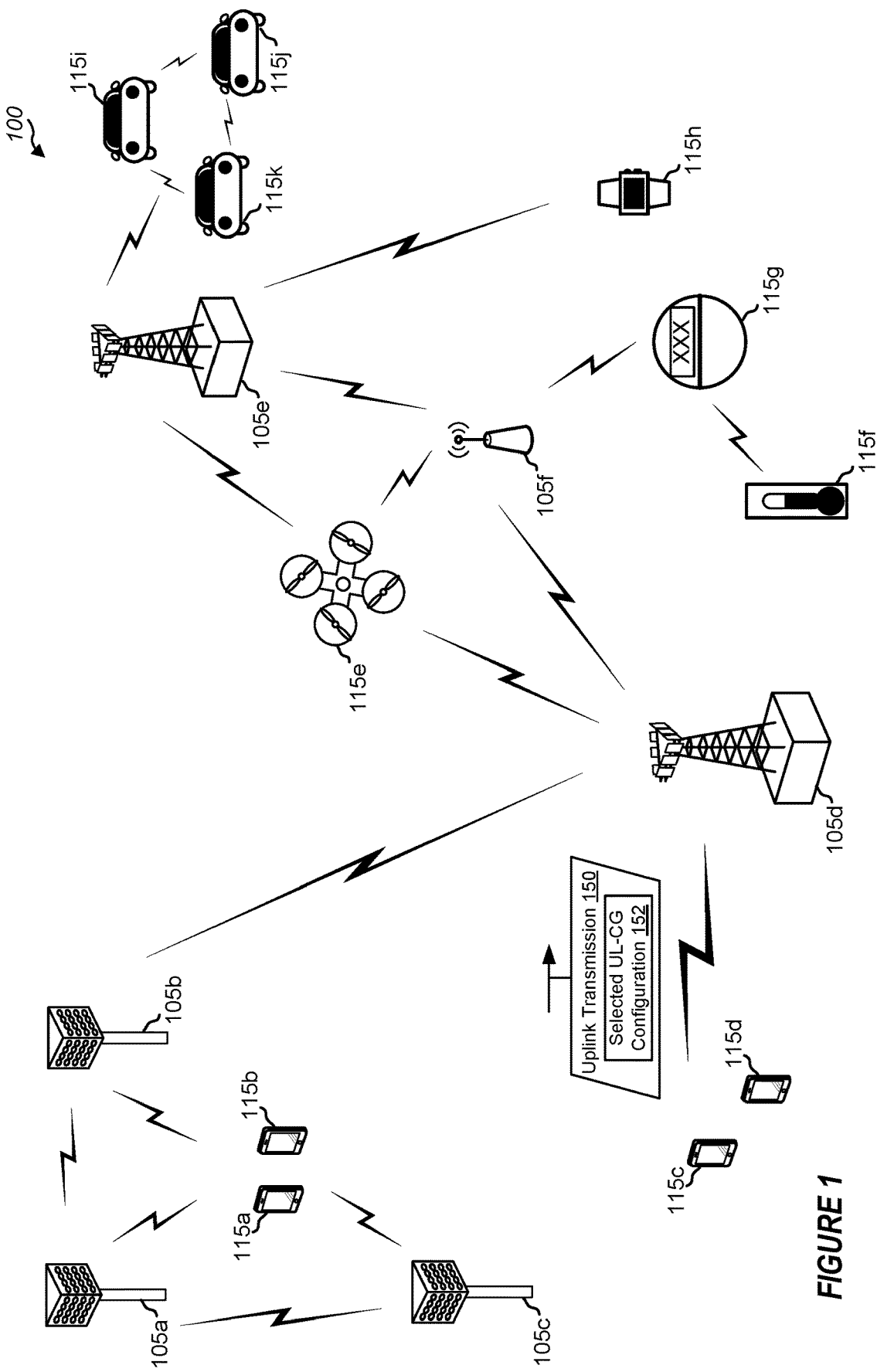
FIG. 1 is a block diagram illustrating an example of a wireless communication system to determine an uplink configured grant (UL-CG) configuration for a sub-band full-duplex (SBFD) resource configuration according to some aspects of the disclosure.

Some wireless communication systems use uplink configured grants (UL-CGs) to enable a user equipment (UE) to transmit data to a base station. For example, a UL-CG may have a particular UL-CG configuration that specifies resources (such as time slots, frequencies, or other resources) that the UE may use to transmit data to the base station during an occasion of the UL-CG.

In some cases, the occasion of the UL-CG may occur during a particular slot that is associated with a sub-band full-duplex (SBFD) resource configuration that conflicts with the UL-CG. To illustrate, resources specified by the UL-CG configuration of the UL-CG may "overlap" with resources of a downlink transmission that is to occur during the slot. Alternatively or in addition, resources specified by the UL-CG configuration of the UL-CG may "overlap" with resources of a guard band that is specified by the SBFD resource configuration. As a particular example, in some cases, the base station may dynamically change the slot from a half-duplex (HD) resource configuration to the SBFD resource configuration, which may create a resource conflict with the UL-CG.

In some aspects of the disclosure, a UE may determine a UL-CG configuration for a slot associated with an SBFD resource configuration. In some examples, the UE selects the UL-CG configuration from a plurality of UL-CG configurations associated with different resource configurations. As an example, the UE may select a first UL-CG configuration from the plurality of UL-CG configurations for an SBFD resource configuration and may select a second UL-CG configuration from the plurality of UL-CG configurations for an HD resource configuration. In some examples, the UE determines the UL-CG configuration using an interlace-based technique, using a grant-based technique, or using slot format based technique.

Alternatively or in addition, in some other aspects, the UE may perform one or more operations to address the resource conflict. For example, the UE may determine an error associated with the slot, may skip an occasion of the UL-CG that is subject to the resource conflict, or may perform a conflict resolution operation to modify one or more parameters associated with an uplink transmission. To illustrate, the UE may avoid using, for the UL-CG, resources subject to the resource conflict (such as by avoiding using a second set of resources of the UL-CG that "overlap" with a downlink communication, with a guard band, or both) and may modify the uplink transmission based on the remaining resources (e.g., a first subset of resources) of the UL-CG. In some examples, performing the conflict resolution operation may include one or more of performing a rate matching operation associated with the uplink transmission, puncturing one or more bits of the second subset, or increasing one or more of a rank of the uplink transmission, a number of precoders associated with the uplink transmission, a modulation and coding scheme (MCS) of the uplink transmission, a code rate of the uplink transmission, a modulation order of the uplink transmission, or a transmit power level of the uplink transmission, as illustrative examples.

Aspects of the disclosure may reduce latency and increase throughput or data rates of wireless communications while also reducing interference that can diminish quality of the wireless communications. For example, a wireless communication system in accordance with some aspects of the disclosure may increase throughput or data rates using SBFD communication techniques. Because SBFD communication techniques may use uplink and downlink channels concurrently, such techniques may increase throughput or data rates and may reduce latency. Further, by reducing or avoiding resource conflicts, interference that can result from some concurrent uplink and downlink transmissions may be reduced or avoided. As a result, latency and interference may be decreased while increasing throughput, data rates, and quality of wireless communications.

To further illustrate, in various implementations, wireless communication networks may include code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km^2), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km^2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example of a wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

In some aspects of the disclosure, one or more UEs 115 may determine a selected UL-CG configuration 152 for a particular slot based on a resource configuration associated with the slot and may perform an uplink transmission 150 based on the selected UL-CG configuration 152. To illustrate, in the example of FIG. 1, the UE 115c may transmit the uplink transmission 150 to the base station 105d. Alternatively or in addition, one or more other UEs 115 may perform the uplink transmission 150.

Figure 2:
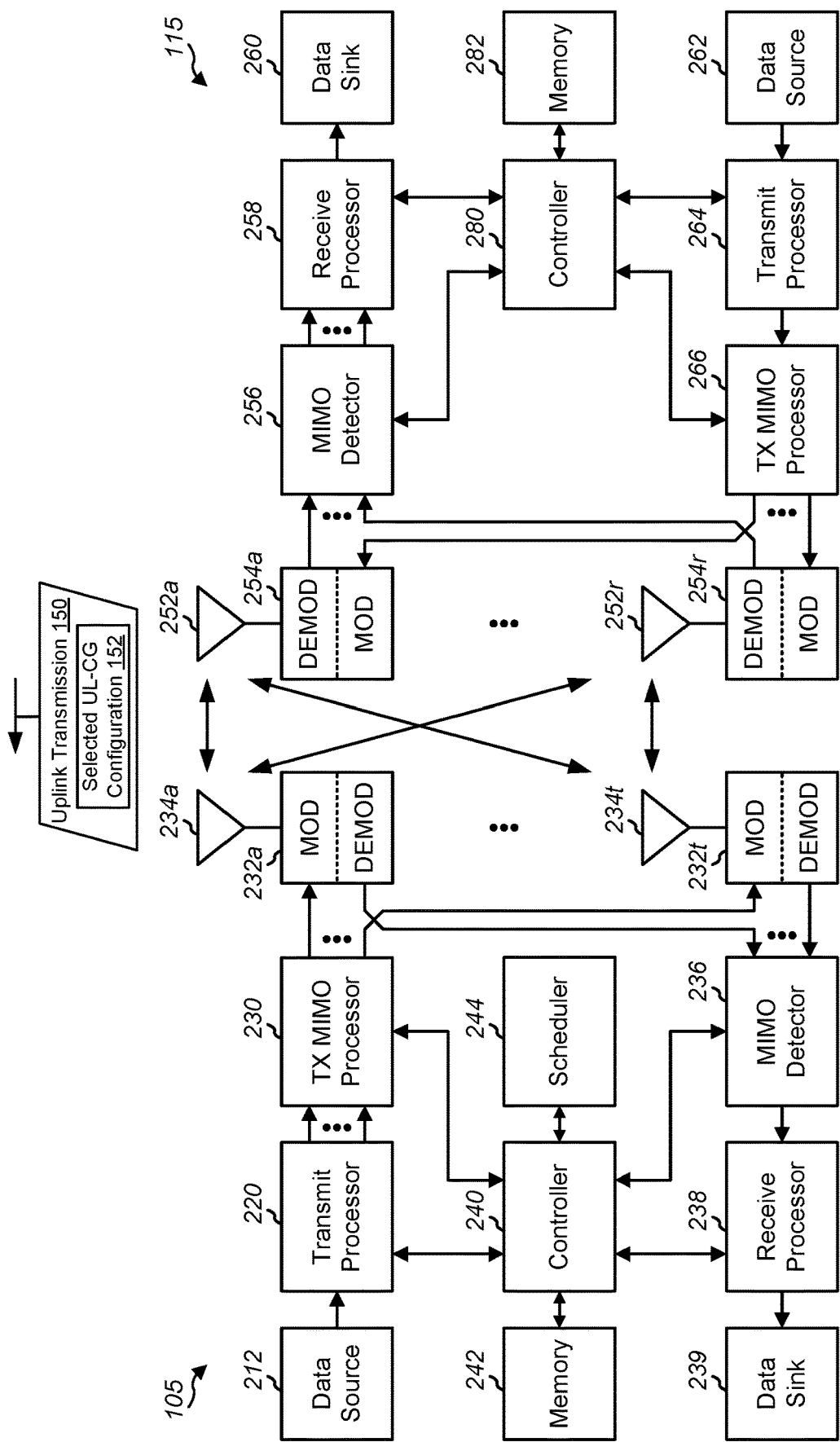
FIG. 2 is a block diagram illustrating examples of a base station and a user equipment (UE) to determine a UL-CG configuration for an SB-FD resource configuration according to some aspects of the disclosure.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to initiate the uplink transmission 150, to perform or direct the execution illustrated in FIGS. 11-14, or to perform one or more other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3:
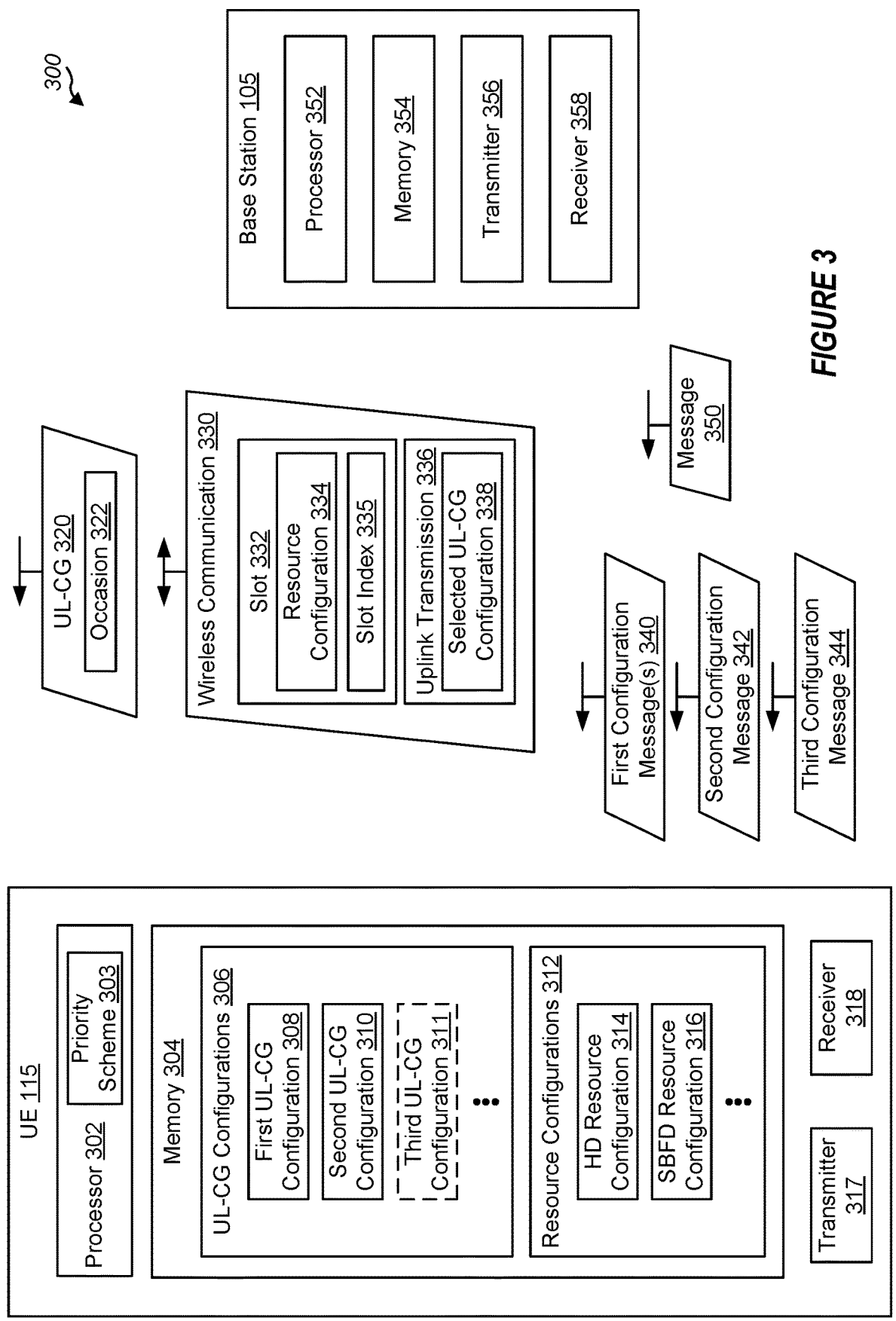
FIG. 3 is a block diagram illustrating another example of a wireless communication system to determine a UL-CG configuration for an SBFD resource configuration according to some aspects of the disclosure.

FIG. 3 is a block diagram of an example of a wireless communications system 300 to determine a UL-CG configuration for an SBFD resource configuration. The wireless communications system 300 includes the UE 115 and the base station 105. Although one UE 115 and one base station 105 are illustrated, in some other implementations, the wireless communications system 300 may generally include multiple UEs 115, and may include more than one base station 105.

The UE 115 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 317 (hereinafter referred to collectively as "the transmitter 317"), and one or more receivers 318 (hereinafter referred to collectively as "the receiver 318"). The processor 302 may be configured to execute instructions stored in the memory 304 to perform the operations described herein. In some implementations, the processor 302 includes or corresponds to one or more of the receive processor 258, the transmit processor 264, and the controller 280, and the memory 304 includes or corresponds to the memory 282.

The transmitter 317 is configured to transmit reference signals, control information and data to one or more other devices, and the receiver 318 is configured to receive references signals, synchronization signals, control information and data from one or more other devices. For example, the transmitter 317 may transmit signaling, control information and data to, and the receiver 318 may receive signaling, control information and data from, the base station 105. In some implementations, the transmitter 317 and the receiver 318 may be integrated in one or more transceivers. Additionally or alternatively, the transmitter 317 or the receiver 318 may include or correspond to one or more components of the UE 115 described with reference to FIG. 2.

The base station 105 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220, and the controller 240, and the memory 354 includes or corresponds to the memory 242.

The transmitter 356 is configured to transmit reference signals, synchronization signals, control information and data to one or more other devices, and the receiver 358 is configured to receive reference signals, control information and data from one or more other devices. For example, the transmitter 356 may transmit signaling, control information and data to, and the receiver 358 may receive signaling, control information and data from, the UE 115. In some implementations, the transmitter 356 and the receiver 358 may be integrated in one or more transceivers. Additionally or alternatively, the transmitter 356 or the receiver 358 may include or correspond to one or more components of base station 105 described with reference to FIG. 2.

In some implementations, the wireless communications system 300 implements a 5G New Radio (NR) network. For example, the wireless communications system 300 may include multiple 5G-capable UEs 115 and multiple 5G-capable base stations 105, such as UEs and base stations configured to operate in accordance with a 5G NR network protocol such as that defined by the 3GPP.

During operation, the UE 115 may receive a plurality of UL-CG configurations 306. In some examples, the UE 115 may receive the plurality of UL-CG configurations 306 from the base station 105. The plurality of UL-CG configurations 306 may include a first UL-CG configuration 308 and a second UL-CG configuration 310. The plurality of UL-CG configurations 306 may be associated with a plurality of resource configurations 312, such as a half-duplex (HD) resource configuration 314 associated with the first UL-CG configuration 308 and a sub-band full-duplex (SBFD) resource configuration 316 associated with the second UL-CG configuration 310. In some examples, the UE 115 may store data (e.g., a lookup table) indicating the UL-CG configurations 306 and the plurality of resource configurations 312. An example of a resource is a resource block (RB). One or more UL-CG configurations of the plurality of UL-CG configurations 306 may be associated with one or more respective parameters, such as a respective slot offset and a respective slot periodicity. One or more UL-CG configurations of the plurality of UL-CG configurations 306 may be optionally associated with a respective uplink bandwidth (UL BW) and a respective uplink bandwidth part (UL BWP) index, as described further below.

The UE 115 may receive a UL-CG 320 from the base station 105. The UL-CG 320 may enable the UE 115 to perform an uplink transmission 336 (e.g., the uplink transmission 150, or another uplink transmission) during an occasion 322 of the UL-CG 320. For example, the UE 115 may perform a wireless communication 330 that includes the uplink transmission 336. One or more operations of the wireless communication 330 may be performed during a slot 332 that is associated with a resource configuration 334. In some examples, the UL-CG 320 indicates or is associated with the second UL-CG configuration 310. For example, the second UL-CG configuration 310 may correspond to a "default" UL-CG configuration of the UL-CG 320.

Figure 4:
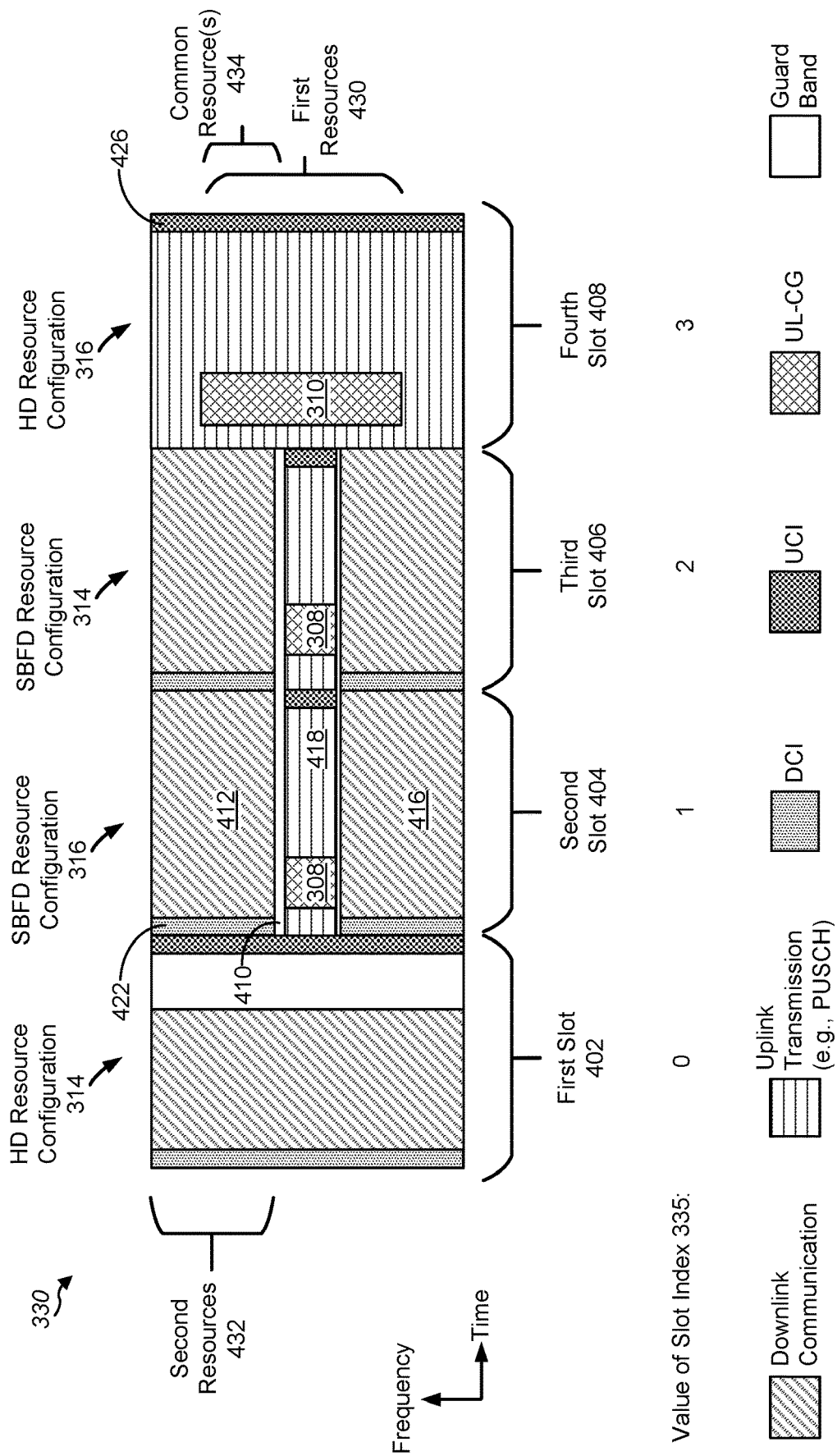
FIG. 4 is a block diagram illustrating an example of a wireless communication that may include a UL-CG configuration for an SBFD resource configuration according to some aspects of the disclosure.

In some cases, performing the uplink transmission 336 based on a particular UL-CG configuration of the UL-CG 320 creates a resource conflict with another communication of the wireless communication 330. To illustrate, FIG. 4 depicts examples of a first slot 402, a second slot 404, a third slot 406, and a fourth slot 408 that may be associated with the wireless communication 330. Any of the slots 402-408 may correspond to the slot 332 of FIG. 3. In the example of FIG. 4, the abscissa corresponds to time, and the ordinate corresponds to frequency.

The first slot 402 and the fourth slot 408 may be associated with the HD resource configuration 314. In some examples, during the first slot 402, the UE 115 may receive a downlink communication that is transmitted based on the HD resource configuration 314 by the base station 105. In some examples, during the fourth slot 408, the UE 115 may transmit an uplink transmission based on the HD resource configuration 314, such as a physical uplink shared channel (PUSCH) transmission.

The second slot 404 and the third slot 406 may be associated with the SBFD resource configuration 316. During each of the slots 404 and 406, the UE 115 may receive a downlink communication from the base station 105 and may transmit an uplink transmission to the base station 105. For example, during the second slot 404, the UE 115 may receive downlink communications 412, 416 concurrently with performing a PUSCH transmission 418.

In some examples, a resource configuration may include a guard band separating resources of different communications. The guard band may reduce or prevent interference from one of the communications to another of the communications. To illustrate, the SBFD resource configuration 316 may include a guard band 410 separating the downlink communication 412 from the PUSCH transmission 418.

In some implementations, a downlink communication may be associated with or may include downlink control information (DCI), and an uplink communication may be associated with or may include uplink control information (UCI). To illustrate, DCI 422 may be transmitted prior to the downlink communication 412, and UCI 426 may be transmitted following an uplink transmission of the fourth slot 408.

In some examples, performing an uplink transmission of an UL-CG of the wireless communication 330 may create a resource conflict with another operation of the wireless communication 330. To illustrate, the UE 115 may perform a PUSCH transmission during the fourth slot 408 based on the second UL-CG configuration 310 without a resource conflict. Performing a PUSCH transmission based on the second UL-CG configuration 310 during the second slot 404 or during the third slot 406 may create a resource conflict between resources of the PUSCH transmission and one or more other resources, such as resources of the guard band 410, resources of the downlink communication 412, or both.

To further illustrate, the second UL-CG configuration 310 may be associated with first resources 430. The guard band 410 and the downlink communication 412 may be associated with second resources 432. The first resources 430 and the second resources 432 include one or more common resources 434, such as an "overlap" between the second UL-CG configuration 310 and one or both of the guard band 410 or the downlink communication 412. In FIG. 4, the first UL-CG configuration 308 does not include common resources with either of the guard band 410 or the downlink communication 412.

FIG. 4 also illustrates that the first UL-CG configuration 308 is different than the second UL-CG configuration 310. For example, the first UL-CG configuration 308 may include a different number or type of resources than the second UL-CG configuration 310. In some examples, the first UL-CG configuration 308 may include fewer frequency resources than the second UL-CG configuration 310, more time resources than the second UL-CG configuration 310, or a combination thereof.

Referring again to FIG. 3, the UE 115 may determine the resource configuration 334 associated with the slot 332 and may determine a selected UL-CG configuration 338 (e.g., the selected UL-CG configuration 152, or another selected UL-CG configuration) from among the plurality of UL-CG configurations 306 for the occasion 322 of the UL-CG 320 that is to occur during the slot 332. In one example, the UE 115 determines that the resource configuration 334 corresponds to the HD resource configuration 314. In this example, the UE 115 may select the first UL-CG configuration 308 as the selected UL-CG configuration 338. In another example, the UE 115 determines that the resource configuration 334 corresponds to the SBFD resource configuration 316. In this example, the UE 115 may select the second UL-CG configuration 310 as the selected UL-CG configuration 338.

In some examples, the UE 115 is configured to select among the plurality of UL-CG configurations 306 based on a value of a slot index 335 associated with the slot 332. To illustrate, in a first example, the UE 115 may select the first UL-CG configuration 308 for slots having values of the slot index 335 corresponding to 1+n*P or 2+n*P and may select the second UL-CG configuration 310 for slots having values of the slot index 335 corresponding to 3+n*P, where n is selected from n=0, 1, 2, 3, . . . , and where P corresponds to a periodicity value, such as P=4. To illustrate, if P=4, then the UE 115 may select the first UL-CG configuration 308 for slots with values of the slot index 335 corresponding to 1, 2, 5, 6, 9, 10, . . . , and may select the second UL-CG configuration 310 for values of the slot index 335 corresponding to 3, 7, 11, . . . , and may select another UL-CG configuration for values of the slot index 335 corresponding to 4, 8, 12, . . . , etc. In some aspects, the first example may be referred to as a "grant-based" technique for determining the selected UL-CG configuration 338.

To further illustrate, in some aspects in accordance with the first example, the UE 115 may receive, from the base station 105, a first configuration message 340 indicating that the first UL-CG configuration 308 is associated with a first set of slots (such as slots 1, 5, 9, . . . ) based on the periodicity value P and with a second set of slots (such as slots 2, 6, 10, . . . ) based on the periodicity value P. The UE 115 may receive, from the base station 105, a second configuration message 342 indicating that the second UL-CG configuration 310 is associated with a third set of slots (such as slots 3, 7, 11, . . . ) based on the periodicity value P.

Although two UL-CG configurations 308, 310 of the plurality of UL-CG configurations 306 have been described, it is noted that in some implementations, the plurality of UL-CG configurations 306 may include a different number of UL-CG configurations. Further, the plurality of UL-CG configurations 306 may include multiple UL-CG configurations associated with the SBFD resource configuration 316. The multiple UL-CG configurations may correspond to the first UL-CG configuration 308 and the third UL-CG configuration 311.

To illustrate, in some aspects of a second example, the UE 115 may receive, from the base station, a third configuration message 344 associated with a third UL-CG configuration 311 of the plurality of UL-CG configurations 306. In the second example, the first configuration message 340 may indicate that the first UL-CG configuration 308 is associated with the first set of slots (such as slots 1, 5, 9, . . . ) based on the periodicity value P, the second configuration message 342 may indicate that the second UL-CG configuration 310 is associated with a second set of slots (such as slots 2, 6, 10, . . . ) based on the periodicity value P, and the third configuration message 344 may indicate that the third UL-CG configuration 311 is associated with a third set of slots third set of slots (such as slots 3, 7, 11, . . . ) based on the periodicity value P. In some aspects, the second example may be referred to as an "interlace-based" technique for determining the selected UL-CG configuration 338.

In accordance with some aspects of a third example, the UE 115 may receive a message 350 modifying a slot format of the slot 332 from a first slot format to a second slot format (also referred to herein as a slot format of the slot 332 or as a particular slot format of the slot 332). The message 350 may include or correspond to a slot format indicator (SFI). In some examples, the message 350 modifies the slot 332 from the HD resource configuration 314 to the SBFD resource configuration 316. In some aspects, the third example may be referred to as a "slot format based" technique for determining the selected UL-CG configuration 338.

In some cases, modification of the slot 332 from the HD resource configuration 314 to the SBFD resource configuration 316 may be associated with a resource conflict. For example, an UL-CG configuration of the UL-CG 320 may indicate the first resources 430 of FIG. 4, and the SBFD resource configuration 316 may include the second resources 432 associated with a downlink transmission to be performed during the slot 332. In this example, the UE 115 may determine that the first resources 430 and the second resources 432 include or correspond to the one or more common resources 434, which may create a resource conflict.

In a first aspect of the third example, the plurality of UL-CG configurations 306 are not associated with an UL BW or with an UL BWP index. In this case, the plurality of UL-CG configurations 306 may be independent of the particular slot format of the slot 332 and may be applicable to the slot 332 independently of the particular slot format. If the particular slot format of the slot 332 indicates one or more uplink resources that are associated with a particular UL-CG configuration of the plurality of UL-CG configurations 306, the UE 115 may perform a PUSCH transmission using the one or more uplink transmissions (e.g., the UE 115 may "expect to receive a PUSCH" using the one or more uplink resources).

In some implementations of the first aspect of the third example, the UE 115 uses a priority scheme 303 in case multiple UL-CG configurations of the plurality of UL-CG configurations 306 are eligible for the PUSCH transmission (such as if multiple UL-CG configurations indicate common resources as the modified slot format of the slot 332). To illustrate, one or more of the plurality of UL-CG configurations 306 may be associated with a respective priority ranking of the priority scheme 303, and the UE may select a particular UL-CG for the PUSCH transmission based on the priority ranking of the particular UL-CG. In some examples, the priority scheme 303 is configured by the base station 105. In some examples, the plurality of UL-CG configurations 306 include MUL-CG configurations, and the priority scheme 303 indicates priority rankings for NUL-CG configurations of the plurality of UL-CG configurations 306, where 1<M, and where 0<N≤M.

In some implementations of the first aspect of the third example, the priority scheme 303 is applicable to UL-CG configurations irrespective of whether or not uplink resources overlap with other resources of a downlink channel or of a guard band. In this case, each UL-CG configuration of the plurality of UL-CG configurations 306 may be associated with a respective priority ranking of the priority scheme 303 irrespective of whether the UL-CG configuration is associated with a common resource as a downlink channel or a guard band. In some other implementations of the first aspect of the third example, the priority scheme 303 may be applicable among only UL-CG configurations not including uplink resources that overlap with other resources of a downlink channel or of a guard band. In this case, at least some of the plurality of UL-CG configurations 306 (e.g., N<M) may correspond to UL-CG configurations that are not associated with a common resource as a downlink channel or a guard band.

In some implementations of the first aspect of the third example, the UE 115 may avoid using resources that overlap with resources of a downlink channel during the slot 332 or that overlap with resources of a guard band during the slot 332 (e.g., the UE 115 may not expect to receive a PUSCH on the overlapping resources). In this case, the UE 115 may skip one or more resources of a UL-CG configuration based on determining that at least one resource associated with the UL-CG configuration is further associated with a downlink channel or a guard band.

The first aspect of the third example may be implemented whether or not the UE 115 is configured to with an SFI. To illustrate, in one example, operations of the first aspect of the third example are performed based on an SFI from the base station 105 (e.g., via the message 350). In this case, the UE 115 may be configured with an SFI indicator the particular slot format of the slot 332. In some other examples, the UE 115 is not configured with an SFI indicator the particular slot format.

In a second aspect of the third example, each UL-CG configuration of the plurality of UL-CG configurations 306 is associated with one or more of a respective UL BW or a respective UL BWP index. In this case, selection of a particular UL-CG configuration from among the plurality of UL-CG configurations 306 may be dependent on the particular slot format of the slot 332 (e.g., by selecting an UL-CG configuration having a UL BW and UL BWP index that matches an UL BW and UL BWP index indicated by the particular slot format of the slot 332). To illustrate, the plurality of UL-CG configurations 306 include at least one first UL-CG configuration (e.g., the first UL-CG configuration 308, or another UL-CG configuration) for non-duplex uplink slots and may further include at least one second UL-CG configuration (e.g., the second UL-CG configuration 310, or another UL-CG configuration) for full duplex slots that are associated with one or more particular UL BWs and with one or more particular UL BWPs. The UE 115 may determine whether one or more UL-CG configurations of the plurality of UL-CG configurations 306 "match" the particular slot format of the slot 332.

In some cases, the UE 115 determines that a particular UL-CG configuration of the plurality of UL-CG configurations 306 matches the particular slot format of the slot 332 (e.g., based on the UL BW and UL BWP index of the particular UL-CG configuration matching the slot format of the slot 332). In this case, the UE 115 may select the matching UL-CG configuration for use during the slot 332. Further, if the UE 115 identifies multiple UL-CG configurations of the plurality of UL-CG configurations 306 that match the particular slot format, the UE 115 may select, from among the multiple UL-CG configurations, the particular UL-CG configuration based on a priority ranking of the particular UL-CG configuration. In some examples, the priority ranking is indicated by the priority scheme 303.

In some other cases, the UE 115 may determine that none of the plurality of UL-CG configurations 306 match the particular slot format of the slot 332 (e.g., if no UL-CG configuration has a UL BW and UL BWP index matching the slot format of the slot 332). In some implementations, the UE 115 and the base station 105 operate based on a wireless communication protocol that specifies that the particular slot format of the slot 332 must match at least one of the plurality of UL-CG configurations 306 (e.g., the wireless communication protocol may disallow this case). In another implementation, the UE 115 may ignore the particular slot format of the slot 332. For example, the UE 115 may perform one or more operations described with reference to the first aspect of the third example (which may be performed independently of the particular slot format of the slot 332). In this case, the UE 115 may determine that the particular slot format fails to match any of the any of the plurality of UL-CG configurations 306 and may determine the particular UL-CG configuration for the slot 332 independently of the particular slot format of the slot 332. In some other implementations, the UE 115 determines not to perform (or "expect") a PUSCH during the slot 332. In this case, the UE 115 may determine that the particular slot format of the slot fails to match any of the plurality of UL-CG configurations 306 and may determine, based on the particular slot format failing to match any of the plurality of UL-CG configurations 306, to skip performing a PUSCH transmission associated with the slot 332.

In a third aspect of the third example, some (but not all) of the plurality of UL-CG configurations 306 may be associated with one or more of a respective UL BW or UL BWP index. In some examples, each UL-CG configuration of a first subset of the plurality of UL-CG configurations 306 is not associated with UL BW or with an UL BWP index, and each UL-CG configuration of a second subset of the plurality of UL-CG configurations 306 is associated with a respective UL BW, with a respective UL BWP index, or both. In some implementations of the third aspect of the third example, the UE 115 may treat each UL-CG configuration of the second subset independently of the particular slot format of the slot 332 (e.g., by "ignoring" the particular slot format). The UE 115 may select a particular UL-CG configuration for the slot 332 from the second subset based on a priority scheme, such as the priority scheme 303. In some examples, one or more resources of the first subset are included as candidate resources for a PUSCH transmission by the UE 115.

In some other implementations of the third aspect of the third example, the UE 115 may select among the first subset using operations described with reference to the first aspect of the third example. For example, the UE 115 may select from among the first subset independently of the particular slot format (e.g., by "ignoring" the particular slot format) and based on a priority scheme, such as the priority scheme 303. In some additional implementations of the third aspect of the third example, the UE 115 may select among both the first subset and the second subset using operations described with reference to the first aspect of the third example. For example, the UE 115 may select from among the first subset and the second subset independently of the particular slot format (e.g., by "ignoring" the particular slot format) and based on a priority scheme, such as the priority scheme 303.

In any of the aspects of the third example, the UE 115 may receive a message indicating whether a UL-CG configuration is to be selected from among the first subset, from among the second subset, or from among both the first subset and the second subset. For example, the message may be included in a radio resource control (RRC) communication transmitted by the base station 105, in a medium access control (MAC) control element (MAC-CE) transmitted by the base station 105, or in downlink control information (DCI) transmitted by the base station 105.

To further illustrate, in each of the first example, the second example, and the third example, at least some of the plurality of UL-CG configurations 306 may or may not overlap one another. To illustrate, overlapping UL-CG configurations may share one or more common resources with one another. In other some other implementations, the UL-CG configurations 306 may be distinct from one another, such as where resources of each UL-CG configuration of the plurality of UL-CG configurations 306 are distinct from resources associated with each other UL-CG configuration of the plurality of UL-CG configurations 306.

Further, in each of the first example, the second example, and the third example, at least some of the plurality of UL-CG configurations 306 may or may not overlap with a downlink transmission or with a guard band. To illustrate, an UL-CG configuration may overlap with a downlink transmission or with a guard band if the UL-CG configuration shares one or more common resources with the downlink transmission or with the guard band. In some other implementations, the UL-CG configurations 306 may be distinct from a downlink transmission, from a guard band, or both, such as where resources of each UL-CG configuration of the plurality of UL-CG configurations 306 are distinct from resources associated with a downlink transmission, resources associated with a guard band, or both.

In some implementations, one or more UL-CG configurations may overlap with downlink or guard band resources by configuration. For example, the UE 115 may receive, from the base station 105, a configuration message indicating that the at least some of the plurality of UL-CG configurations share one or more common resources with the downlink transmission or with the guard band. In some other implementations, one or more UL-CG configurations may overlap with downlink or guard band resources based on the UE 115 receiving a SFI, which may be included in the message 350. For example, the UE 115 may receive, from the base station 105, an SFI indicating modification of the slot 332 from an uplink resource configuration to a full duplex resource configuration, and the at least some of the plurality of UL-CG configurations 306 may share one or more common resources with the downlink transmission or with the guard band based on the modification of the slot 332.

One or more aspects of FIGS. 3 and 4 may reduce latency and increase throughput or data rates of wireless communications while also reducing interference that can diminish quality of the wireless communications. For example, in some aspects, the wireless communication system 300 may increase throughput or data rates using SBFD communication techniques. Because SBFD communication techniques may use uplink and downlink channels concurrently, such techniques may increase throughput or data rates and may reduce latency. Further, by reducing or avoiding resource conflicts, the wireless communication system 300 may reduce or avoid interference that can result from some concurrent uplink and downlink transmissions. As a result, latency and interference may be decreased while increasing throughput, data rates, and quality of wireless communications.

Figure 5:
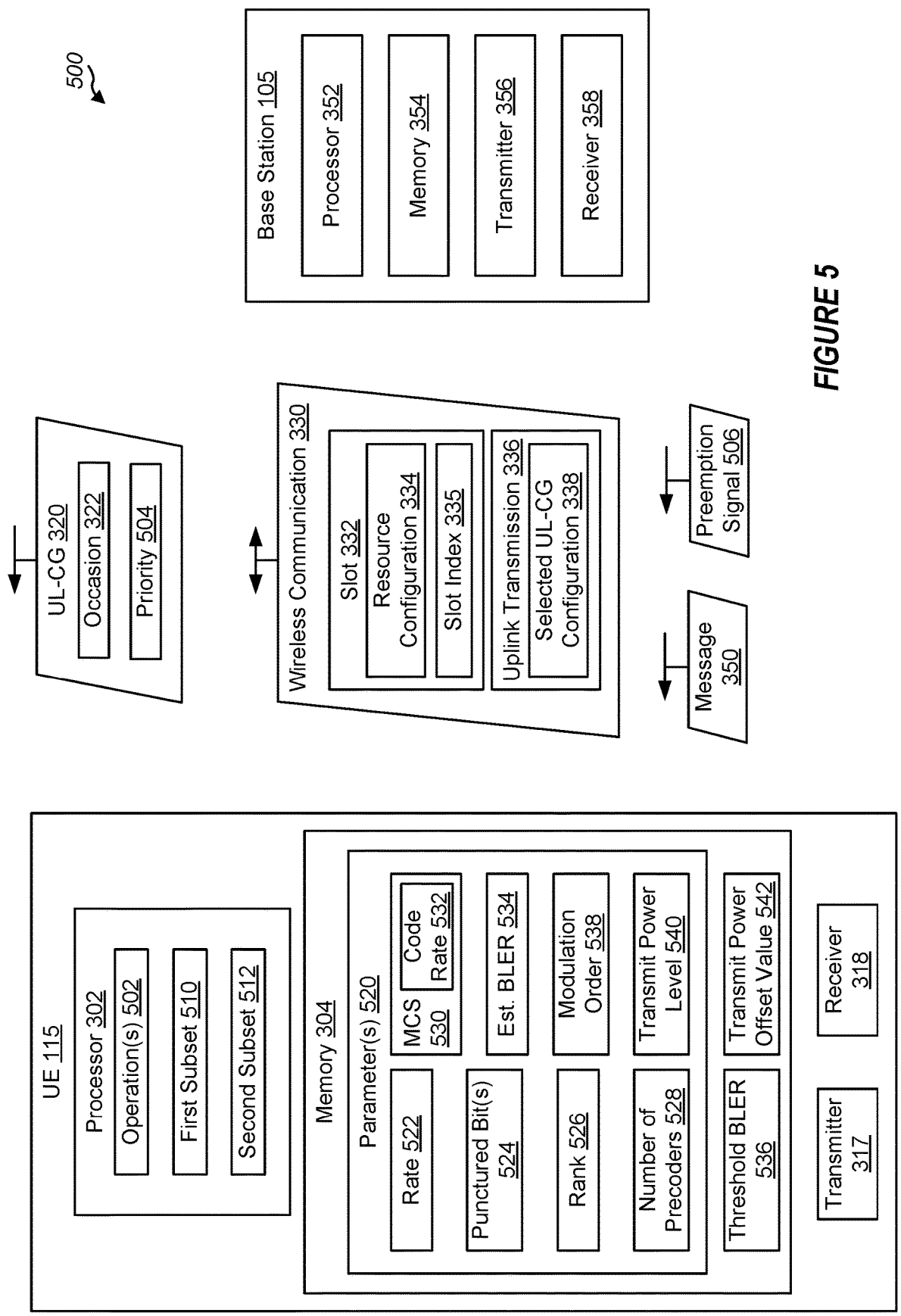
FIG. 5 is a block diagram illustrating another example of a wireless communication system to determine a UL-CG configuration for an SBFD resource configuration according to some aspects of the disclosure.

FIG. 5 is a block diagram of another example of a wireless communications system 500 to determine a UL-CG configuration for an SBFD resource configuration. One or more aspects of FIG. 5 may be as described with reference to FIGS. 3 and 4. For example, the wireless communications system 500 includes the UE 115 and the base station 105. Further, it is noted that one or more operations described with reference to FIG. 5 may be performed alternatively or in addition to one or more operations described with reference to FIGS. 3 and 4.

During operation, the UE 115 may receive the UL-CG 320 from the base station 105. The UL-CG 320 may have an UL-CG configuration associated with the first resources 430 of FIG. 4. In some examples, the occasion 322 of the UL-CG 320 is to occur during the slot 332.

In some cases, the UE 115 may receive a message (such as the message 350) from the base station 105 indicating modification of resources associated with the slot 332. For example, the message 350 may modify resources associated with the slot 332 from the HD resource configuration 314 to the SBFD resource configuration 316. The SBFD resource configuration 316 may include the second resources 432, and the second resources 432 may be associated with a downlink transmission (such as the downlink communication 412 of FIG. 4) or with a guard band (such as the guard band 410 of FIG. 4).

The UE 115 may determine that the first resources 430 and the second resources 432 include one or more common resources, such as the one or more common resources 434. For example, in some implementations, the UE 115 may compare first resource identifiers (such as indices) of the first resources 430 to second resource identifiers of the second resources 432 to determine that the first resource identifiers and the second resource identifiers include one or more common resource identifiers of one or more common resources 434.

Based on determining that the first resources 430 and the second resources 432 include the one or more common resources 434, the UE 115 may perform one or more operations 502 associated with the slot 332. In some examples, the one or more operations 502 include one or more of an error determination operation, an UL-CG occasion skipping operation, a PUSCH transmission operation, or a resource conflict resolution operation.

To illustrate, in an example of an error determination operation, performing the one or more operations 502 may include determining that the slot 332 is associated with an error based on the one or more common resources 434. Depending on the implementation, the UE 115 may perform one or more operations based on determining the error, such as by sending an error report to a network device, such as the base station 105, by performing one or more other operations, or a combination thereof.

Alternatively or in addition, in an example of the UL-CG occasion skipping operation, performing the one or more operations 502 may include determining to skip the occasion 322 of UL-CG 320 during the slot 332 and based on the one or more common resources 434. In this case, the UE 115 may avoid performing the uplink transmission 336 during the slot 332. In some examples, the UE 115 may delay performing the uplink transmission 336 from one slot to another slot, such as by delaying performing the uplink transmission 336 from the second slot 404 until the third slot 406 or until the fourth slot 408, or by delaying performing the uplink transmission 336 from the third slot 406 until the fourth slot 408.

Alternatively or in addition, in an example of the PUSCH transmission operation, the UE 115 may assume that a CG PUSCH is sent over a non-overlapping UL-CG configuration. For example, the UE 115 may perform a PUSCH transmission during the slot 332 using one or more third resources that are not included in the second resources 432. In some examples, the UE 115 determines the non-overlapping UL-CG configuration by selecting, from among multiple UL-CG configurations (e.g., the plurality of UL-CG configurations 306), the UL-CG configuration based on a comparison of index values associated with the multiple UL-CG configurations (e.g., by selecting the UL-CG configuration with the smallest index value) or based on a priority scheme associated with the multiple UL-CG configurations, such as the priority scheme 303 of FIG. 3.

Alternatively or in addition, in an example of the resource conflict resolution operation, the UE 115 may perform the one or more operations 502 based on a priority scheme. To illustrate, in one example, a UL-CG configuration of the UL-CG 320 indicates a priority 504 associated with the UL-CG 320. The priority 504 may indicate whether the UL-CG 320 has priority (or precedence) to resources associated with a resource conflict, such as the second resources 432. In some examples, the priority 504 has one of a first value or a second value. The first value may indicate that the UL-CG 320 has priority (or precedence) to the second resources 432, and the second value may indicate that the UL-CG 320 does not have priority to the second resources 432. In this example, the UE 115 may perform the uplink transmission 336 during the occasion 322 of the UL-CG 320 based on the first value or may skip the occasion 322 (e.g., by performing the UL-CG occasion skipping operation) based on the second value. In some examples, the priority 504 is indicated by one or more of a dedicated field or a priority flag.

Alternatively or in addition, in another example of the resource conflict resolution operation, the UE 115 may perform the one or more operations 502 based on a preemption scheme. In some examples of the preemption scheme, the UE 115 may receive a preemption signal 506. The preemption signal 506 may indicate that the second resources 432 are preempted from use for the UL-CG 320 during the slot 332 (e.g., due to one or more other devices having priority to the second resources 432). In some implementations, the UE 115 transmits (e.g., by performing the uplink transmission) 336 during the occasion 322 using the second resources 432 by default during the slot 332 unless the UE 115 receives the preemption signal 506.

Alternatively or in addition, in another example of the resource conflict resolution operation, performing the one or more operations 502 may include selecting a first subset 510 of the first resources 430 for the UL-CG 320. The first resources 430 may further include a second subset 512 that is excluded from the first subset 510. As an example, referring again to FIG. 4, the first subset 510 may include resources of the PUSCH transmission 418, and the second subset 512 may include one or more resources of the guard band 410, one or more resources of the downlink communication 412, or a combination thereof. In some examples, the second subset 512 corresponds to the one or more common resources 434.

The UE 115 may adjust one or more parameters 520 of the uplink transmission 336 based on the first subset 510. In some examples, the UE 115 adjusts the one or more parameters 520 using a rate matching technique to adjust the uplink transmission from being based on the first resources to being based on the first subset of the first resources. In some examples, rate matching the uplink transmission 336 includes repeating or puncturing one or more bits of the uplink transmission 336 so that a number of bits of the uplink transmission 336 corresponds to a resource size of the first subset 510. For example, the UE 115 may adjust a rate 522 associated with the uplink transmission 336 from a first value to a second value.

Alternatively or in addition, adjusting the one or more parameters 520 may include puncturing one or more bits 524 associated with the second subset 512. For example, the UE 115 may delete one or more bits 524 of the uplink transmission 336 that are associated with the second subset 512.

Alternatively or in addition, adjusting the one or more parameters 520 may include increasing a rank 526 of the uplink transmission 336 to reduce a number of resources associated with the uplink transmission 336. For example, the UE 115 may increase the rank 526 from a first value (which may correspond to a "default" rank value, or another value) of a plurality of values to a second value (which may correspond to a "maximum" rank value, or another value) within the plurality of values. To illustrate, the plurality of values may correspond to values of one, two, three, and four.

In some implementations, adjusting the one or more parameters 520 may further include adjusting a number of precoders 528 associated with the uplink transmission, adjusting a value of one or more precoders, or both. For example, the UE 115 may increase the number of precoders 528 from a first value (such as a default number of precoders) to a second value that is based on the increased value of the rank 526. To illustrate, in some implementations, the UE 115 may add an additional set of precoders to the number of precoders 528 for each value increase of the rank 526 (such as by adding four sets of precoders to the number of precoders 528 based on increasing the rank 526 from four to eight). Alternatively or in addition, a value of a precoder may be changed. For example, each precoder may include or correspond to a vector of complex values, and any of the complex values may be reordered or replaced with another value.

In some examples, each rank value associated with the UE 115 is associated with a respective number of precoders 528, and a change in the rank value may be associated with a change in the number of precoders 528. To illustrate, in some implementations, increasing the rank value from two to four results in an increase of the number of precoders 528 from two precoders to four precoders. Alternatively or in addition, each rank value associated with the UE 115 may be associated with a respective set of precoders, and a change in the rank value may be associated with a change in the particular set of precoders used by the UE 115 (either with or without changing the number of precoders 528). To illustrate, in some implementations, increasing the rank value from two to four results in change from a first set of two precoders to a second set of two precoders different than the first set.

Alternatively or in addition, adjusting the one or more parameters 520 may include modifying a modulation and coding scheme (MCS) 530 of the uplink transmission 336, such as by modifying a code rate 532 associated with the MCS 530, by adjusting the MCS 530 from a first MCS of a plurality of MCSs to a second MCS of the plurality of MCSs based on an estimated block error rate (BLER) 534 associated with the second MCS, or both. In some examples, the UE 115 modifies the MCS 530 such that the estimated BLER 534 associated with uplink transmission 336 is less than (or less than or equal to) a threshold BLER 536 (e.g., twenty percent, or another value). For example, the UE 115 may determine the estimated BLER 534 and may determine whether the estimated BLER 534 is less than (or less than or equal to) the threshold BLER 536. In response to the estimated BLER 534 failing to satisfy the threshold BLER 536 (e.g., being less than twenty percent), the UE 115 may adjust the MCS 530 from the first MCS to the second MCS. In response to the estimated BLER 534 satisfying the threshold BLER 536 (e.g., being greater than or equal to twenty percent), the UE 115 may perform the uplink transmission 336 using the first MCS or may postpone the uplink transmission 336.

Alternatively or in addition, adjusting the one or more parameters 520 may include increasing, independently of the code rate, a modulation order 538 associated with the uplink transmission 336 from a first modulation order to a second modulation order based on an estimated BLER associated with the second modulation order (e.g., the estimated BLER 534 or another estimated BLER). In some examples, the UE 115 modifies the modulation order 538 such that the estimated BLER is less than (or less than or equal to) the threshold BLER 536. For example, the UE 115 may determine the estimated BLER and may determine whether the estimated BLER is less than (or less than or equal to) the threshold BLER 536. In response to the estimated BLER failing to satisfy the threshold BLER 536, the UE 115 may adjust the modulation order from the first modulation order to the second modulation order. In response to the estimated BLER satisfying the threshold BLER 536, the UE 115 may perform the uplink transmission 336 using the first modulation order or may postpone the uplink transmission 336.

Alternatively or in addition, adjusting the one or more parameters 520 may include adjusting a transmit power level 540 associated with the uplink transmission based on a transmit power offset value 542, such as by increasing the transmit power level 540 by an amount indicated by the transmit power offset value 542. In some examples, the transmit power offset value 542 is a "global" value that is applied to multiple UL-CGs. In this case, the transmit power offset value 542 may be associated with a plurality of UL-CGs that includes the UL-CG 320. In another example, the transmit power offset value 542 may be specific to the UL-CG 320. In this case, the UE 115 may select the transmit power offset value 542 from among a plurality of transmit power offset values, where each of the plurality of transmit power offset values is associated with a respective UL-CG of a plurality of UL-CGs that includes the UL-CG 320.

Depending on the particular implementation, one or more aspects described with reference to FIG. 5 may be used in connection with semi-persistent scheduling (SPS) performed by the base station 105. For example, in some circumstances, the UE 115 may detect a resource conflict between CG resources and resources of an SPS downlink transmission to be performed by the base station 105. In some implementations, such a resource conflict is disallowed. For example, the UE 115 (and the base station 105) may operate based on a wireless communication protocol that specifies that a resource conflict between CG resources and the SPS resources (e.g., due to the one or more common resources 434) is disallowed.

In another example, a conflict between SPS resources and CG resources may be allowed, such as where the UE 115 selects non-conflicted CG resources for UL communication (e.g., by avoiding use of the one or more common resources 434). In this example, the UE 115 may perform an uplink transmission during the occasion 322 using the at least one of the first resources 430 and without using the one or more common resources 434.

In some other examples, a conflict between SPS resources and CG resources is resolved using a priority scheme to decide between an UL transmission and an SPS downlink transmission. In this case, the UE 115 may perform (e.g., using the priority scheme) a selection among the SPS downlink transmission or the uplink transmission during the occasion 322 to determine a selected communication for the slot 332. In some cases, in response to a tie between the SPS downlink transmission and the uplink transmission based on the priority scheme, the tie can be resolved using one or more operations. In some examples, in response to the tie, both the downlink transmission and the uplink transmission may be avoided. In some other examples, in response to the tie, operation may use non-conflicted resources to perform an uplink transmission during the occasion 322 (e.g., using the at least one of the first resources 430 and without using the one or more common resources 434). In some other examples, the tie may be resolved by the base station 105. For example, the UE 115 may receive, from the base station 105, a message indicating selection of one of the SPS downlink transmission or the uplink transmission. The message may be included in an RRC communication, in a MAC-CE, or in DCI transmitted by the base station 105 to the UE 115. In another example, the UE 115 receives, from the base station 105, a message indicating one or more tie resolution criteria, and the UE 115 determines whether to perform a semi-persistent scheduling (SPS) transmission or a configured grant (CG) transmission based on the one or more tie resolution criteria.

One or more features described with reference to FIG. 5 may be configured by the base station 105. For example, the UE 115 may receive, from the base station 105, a message indicating one or more contention resolution operations to be performed by the UE 115 in response to identification that the first resources 430 and the second resources 432 share the one or more common resources 434. In some examples, the message is included in an RRC communication, in a MAC CE, or in DCI transmitted by the base station 105 to the UE 115.

One or more aspects of FIG. 5 may reduce latency and increase throughput or data rates of wireless communications while also reducing interference that can diminish quality of the wireless communications. For example, in some aspects, the wireless communication system 500 may increase throughput or data rates using SBFD communication techniques. Because SBFD communication techniques may use uplink and downlink channels concurrently, such techniques may increase throughput or data rates and may reduce latency. Further, by reducing or avoiding resource conflicts, the wireless communication system 500 may reduce or avoid interference that can result from some concurrent uplink and downlink transmissions. As a result, latency and interference may be decreased while increasing throughput, data rates, and quality of wireless communications.

Figure 6:
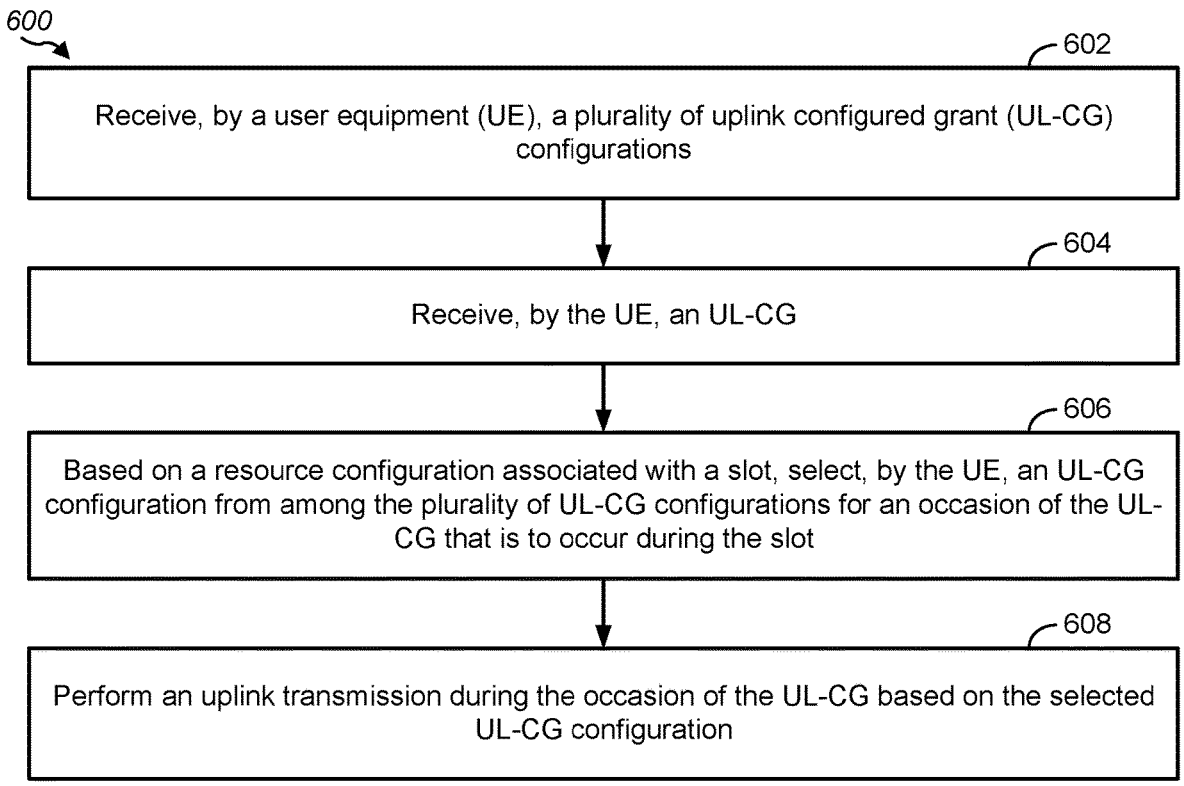
FIG. 6 is a flow chart of an example of a method of wireless communication by a UE to determine a UL-CG configuration for an SBFD resource configuration according to some aspects of the disclosure.

FIG. 6 is a flow chart of an example of a method 600 of wireless communication by a UE to determine a UL-CG configuration for an SBFD resource configuration according to some aspects of the disclosure. In some examples, the method 600 is performed by the UE 115 (e.g., using the transmitter 317 and the receiver 318).

The method 600 includes includes receiving, by a UE, a plurality of UL-CG configurations, at 602. For example, the UE 115 may receive the UL-CG configurations 306 from the base station 105. In some examples, the receiver 318 is configured to receive the UL-CG configurations 306.

The method 600 further includes receiving, by the UE, an UL-CG, at 604. For example, the UE 115 may receive the UL-CG 320 from the base station 105. In some examples, the receiver 318 is configured to receive the UL-CG 320.

The method 600 further includes selecting, based on a resource configuration associated with a slot, an UL-CG configuration from among the plurality of UL-CG configurations for an occasion of the UL-CG that is scheduled to occur during the slot, at 606. For example, the occasion 322 of the UL-CG 320 may occur during the slot 332, and the UE 115 may select any of the UL-CG configurations 306 for the occasion 322 based on the resource configuration 334 associated with the slot 332. In some examples, the processor 302 is configured to select one of the UL-CG configurations 306 for the occasion 322 based on the resource configuration 334 associated with the slot 332.

The method 600 further includes performing an uplink transmission during the occasion of the UL-CG based on the selected UL-CG configuration, at 608. For example, the UE 115 may perform the uplink transmission 336 based on the selected UL-CG configuration 338, which may correspond to one of the UL-CG configurations 306 selected by the UE 115 (e.g., at 606). In some examples, the transmitter 317 is configured to perform the uplink transmission 336 based on the selected UL-CG configuration 338.

Figure 7:
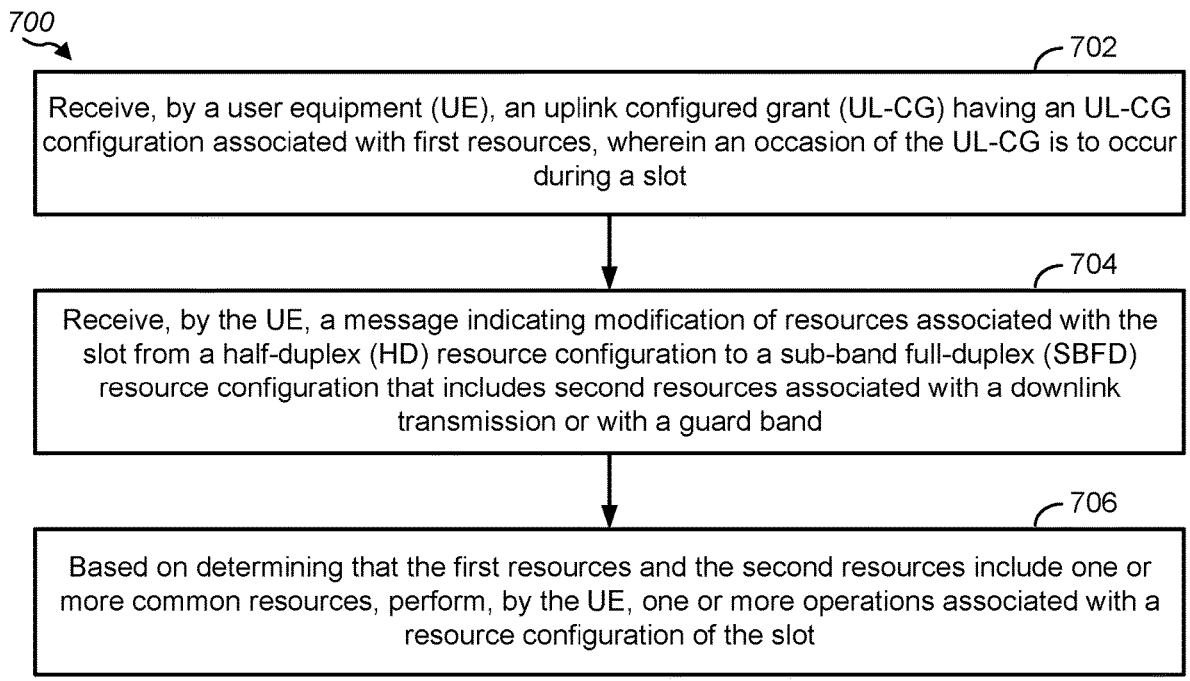
FIG. 7 is a flow chart of another example of a method of wireless communication by a UE to determine a UL-CG configuration for an SBFD resource configuration according to some aspects of the disclosure.

FIG. 7 is a flow chart of another example of a method 700 of wireless communication by a UE to determine a UL-CG configuration for an SBFD resource configuration according to some aspects of the disclosure. In some examples, the method 700 is performed by the UE 115 (e.g., using the transmitter 317 and the receiver 318).

The method 700 includes receiving, by a UE, an UL-CG having an UL-CG configuration associated with first resources, at 702. An occasion of the UL-CG is to occur during a slot. For example, the UE 115 may receive the UL-CG 320 having the HD resource configuration 314 associated with the first resources 430, and the occasion 322 of the UL-CG 320 may be scheduled to occur during the slot 332. In some examples, the receiver 318 may be configured to receive the UL-CG 320.

The method 700 further includes receiving, by the UE, a message indicating modification of resources associated with the slot from an HD resource configuration to an SBFD resource configuration that includes second resources associated with a downlink transmission or with a guard band, at 704. For example, the UE 115 may receive the message 350 modifying the slot 332 from the HD resource configuration 314 to the SBFD resource configuration 316, and the SBFD resource configuration 316 may include the second resources 432 associated with the guard band 410, the downlink communication 412, or both. In some examples, the receiver 318 may be configured to receive the message 350.

The method 700 further includes, based on determining that the first resources and the second resources include one or more common resources, performing, by the UE, one or more operations associated with a resource configuration of the slot, at 706. For example, the UE 115 may perform any of the one or more operations 502 described with reference to FIG. 5. In some examples, the UE 115 is configured to perform the one or more operations 502 using one or components of the UE 115, such as using one or more of the processor 302, the memory 304, the transmitter 317, or the receiver 318.

Figure 8:
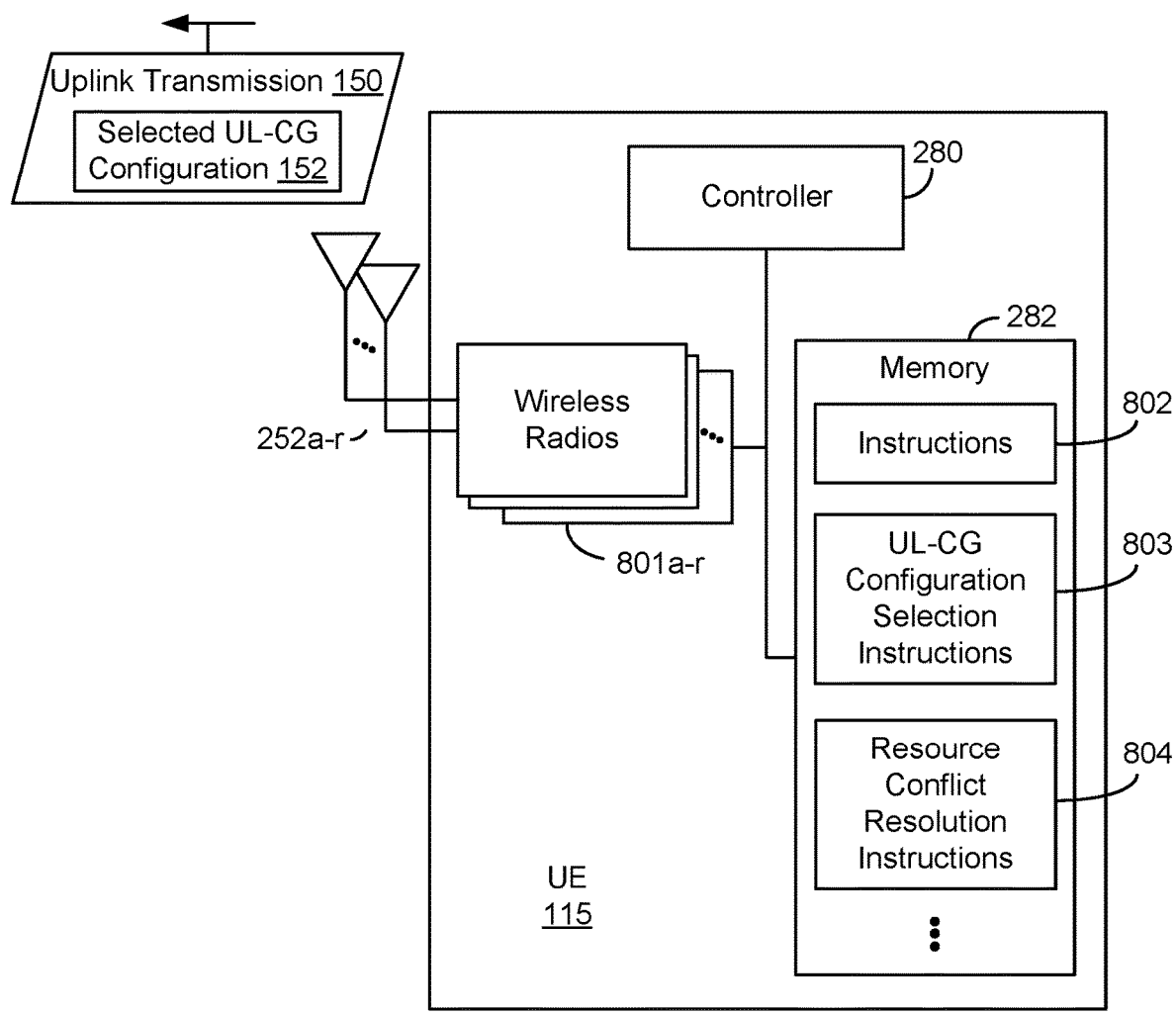
FIG. 8 is a block diagram illustrating an example of a UE to determine a UL-CG configuration for an SBFD resource configuration according to some aspects of the disclosure.

FIG. 8 is a block diagram illustrating an example of a UE 115 to determine a UL-CG configuration for an SBFD resource configuration according to some aspects of the disclosure. The UE 115 may include the controller 280 (e.g., the processor 302, one or more other processors, or a combination thereof) and the memory 282 (e.g., the memory 304, one or more other memories, or a combination thereof). The controller 280 may execute instructions 802 stored in the memory 282 to initiate, perform, or control one or more operations described herein, such as to initiate or control transmission of the uplink transmission 150. To illustrate, the controller 280 may execute the instructions 802 to transmit and receive signals via wireless radios 801a-r and the antennas 252a-r. The wireless radios 801a-r may include hardware or components corresponding to one or more features described herein, such as the modulator/demodulators 254a-r, the MIMO detector 256, the receive processor 258, the transmit processor 264, the TX MIMO processor 266, the transmitter 317, the receiver 318, one or more other components, or a combination thereof.

In some examples, the controller 280 executes UL-CG configuration selection instructions 803 to select among the UL-CG configurations 306. Alternatively or in addition, the controller 280 may execute resource conflict resolution instructions 804 to identify a resource conflict (e.g., by identifying that the first resources 430 and the second resources 432 share the one or more common resources 434) and to initiate, perform, or control any of the one or more operations 502 to resolve or address the resource conflict.

It is noted that one or more operations described with reference to FIGS. 1-8 may be combined with one or more operations described with reference to another of the figures. For example, one or more operations of FIG. 6 may be combined with one or more operations of FIG. 7.

In some aspects, an apparatus configured for wireless communication, such as a UE, is configured to determine a UL-CG configuration for an SBFD resource configuration. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

To further illustrate, in a first aspect, an apparatus for wireless communication includes a receiver configured to receive a plurality of uplink configured grant (UL-CG) configurations and to receive an UL-CG. The apparatus further includes a transmitter configured to perform, based on a UL-CG configuration of the plurality of UL-CG configurations, an uplink transmission during an occasion of the UL-CG. The occasion occurs during a slot, and the UL-CG configuration is selected from among the plurality of UL-CG configurations based on a resource configuration associated with the slot.

In a second aspect alternatively or in addition to the first aspect, the plurality of UL-CG configurations include a first UL-CG configuration associated with a half-duplex (HD) resource configuration and further include a second UL-CG configuration associated with a sub-band full-duplex (SBFD) resource configuration.

In a third aspect alternatively or in addition to one or more of the first through second aspects, the resource configuration corresponds to an SBFD resource configuration, and the UL-CG configuration corresponds to the first UL-CG configuration.

In a fourth aspect alternatively or in addition to one or more of the first through third aspects, the resource configuration corresponds to an HD resource configuration, and the UL-CG configuration corresponds to the second UL-CG configuration.

In a fifth aspect alternatively or in addition to one or more of the first through fourth aspects, the receiver is further configured to: receive a first configuration message indicating that a first UL-CG configuration of the plurality of UL-CG configurations is associated with a first set of slots based on a periodicity value and with a second set of slots based on the periodicity value; and to receive a second configuration message indicating that a second UL-CG configuration of the plurality of UL-CG configurations is associated with a third set of slots based on the periodicity value.

In a sixth aspect alternatively or in addition to one or more of the first through fifth aspects, the receiver is further configured to: receive a first configuration message indicating that a first UL-CG configuration of the plurality of UL-CG configurations is associated with a first set of slots based on a periodicity value; to receive a second configuration message indicating that a second UL-CG configuration of the plurality of UL-CG configurations is associated with a second set of slots based on the periodicity value; and to receive a third configuration message indicating that a third UL-CG configuration of the plurality of UL-CG configurations is associated with a third set of slots based on the periodicity value.

In a seventh aspect alternatively or in addition to one or more of the first through sixth aspects, the receiver is further configured to receive a message modifying a particular slot format of the slot.

In an eighth aspect alternatively or in addition to one or more of the first through seventh aspects, the message indicates modification of the particular slot format from a half-duplex (HD) resource configuration to a sub-band full-duplex (SBFD) resource configuration.

In a ninth aspect alternatively or in addition to one or more of the first through eighth aspects, one or more of the plurality of UL-CG configurations are associated with respective a slot offset of the particular slot format and with a respective slot periodicity of the particular slot format.

In a tenth aspect alternatively or in addition to one or more of the first through ninth aspects, the plurality of UL-CG configurations are not associated with an uplink bandwidth (UL BW) or with an uplink bandwidth part (UL BWP) index, and the plurality of UL-CG configurations are independent of the particular slot format and are applicable to the slot independently of the particular slot format.

In an eleventh aspect alternatively or in addition to one or more of the first through tenth aspects, the particular slot format indicates one or more uplink resources that are associated with the UL-CG configuration, and the transmitter is further configured to perform a physical uplink shared channel (PUSCH) transmission using the one or more uplink resources.

In a twelfth aspect alternatively or in addition to one or more of the first through eleventh aspects, at least some of the plurality of UL-CG configurations are associated with a priority scheme, and the UL-CG is selected for the PUSCH transmission based on a priority ranking of the UL-CG within the priority scheme.

In a thirteenth aspect alternatively or in addition to one or more of the first through twelfth aspects, each UL-CG configuration of the plurality of UL-CG configurations is associated with a respective particular priority ranking of the priority scheme irrespective of whether the UL-CG configuration is associated with a common resource as a downlink channel or a guard band.

In a fourteenth aspect alternatively or in addition to one or more of the first through thirteenth aspects, the at least some of the plurality of UL-CG configurations correspond to UL-CG configurations that are not associated with a common resource as a downlink channel or a guard band.

In a fifteenth aspect alternatively or in addition to one or more of the first through fourteenth aspects, the transmitter is further configured to skip one or more resources of the UL-CG configuration based on a determination that at least one resource associated with the UL-CG configuration is further associated with a downlink channel or a guard band.

In a sixteenth aspect alternatively or in addition to one or more of the first through fifteenth aspects, the receiver is further configured to receive an indication of the particular slot format.

In a seventeenth aspect alternatively or in addition to one or more of the first through sixteenth aspects, the indication includes a slot format indicator (SFI) indicating the particular slot format.

In an eighteenth aspect alternatively or in addition to one or more of the first through seventeenth aspects, each UL-CG configuration of the plurality of UL-CG configurations is associated with one or more of a respective uplink bandwidth (UL BW) or a respective uplink bandwidth part (UL BWP) index.

In a nineteenth aspect alternatively or in addition to one or more of the first through eighteenth aspects, the plurality of UL-CG configurations include at least one first UL-CG configuration for non-duplex uplink slots, and the plurality of UL-CG configurations further include at least one second UL-CG configuration for full duplex slots that are associated with one or more particular UL BWs and with one or more particular UL BWPs.

In a twentieth aspect alternatively or in addition to one or more of the first through nineteenth aspects, a method of wireless communication includes receiving, by a user equipment (UE), a plurality of uplink configured grant (UL-CG) configurations. The method further includes receiving, by the UE, an UL-CG. The method further includes, based on a resource configuration associated with a slot, selecting, by the UE, an UL-CG configuration from among the plurality of UL-CG configurations for an occasion of the UL-CG that is to occur during the slot. The method further includes performing an uplink transmission during the occasion of the UL-CG based on the selected UL-CG configuration.

In a twenty-first aspect alternatively or in addition to one or more of the first through twentieth aspects, a user equipment (UE) for wireless communication includes a transmitter and a receiver. The receiver is configured to receive an uplink configured grant (UL-CG) having an UL-CG configuration associated with first resources. An occasion of the UL-CG is to occur during a slot. The receiver is further configured to receive a message indicating modification of resources associated with the slot from a half-duplex (HD) resource configuration to a sub-band full-duplex (SBFD) resource configuration that includes second resources associated with a downlink transmission or with a guard band. The UE is configured to perform, based on determining that the first resources and the second resources include one or more common resources, one or more operations associated with a resource configuration of the slot.

In a twenty-second aspect alternatively or in addition to one or more of the first through twenty-first aspects, the one or more operations include determining an error associated with the slot.

In a twenty-third aspect alternatively or in addition to one or more of the first through twenty-second aspects, the one or more operations include determining to skip the occasion of the UL-CG during the slot based on the one or more common resources.

In a twenty-fourth aspect alternatively or in addition to one or more of the first through twenty-third aspects, the transmitter is configured to perform a physical uplink shared channel (PUSCH) transmission during the slot using one or more third resources that are not included in the second resources.

In a twenty-fifth aspect alternatively or in addition to one or more of the first through twenty-fourth aspects, the one or more third resources are associated with a particular UL-CG configuration of multiple UL-CG configurations, and the UE is further configured to select the particular UL-CG configuration for the PUSCH transmission based on a comparison of index values associated with the multiple UL-CG configurations or based on a priority scheme associated with the multiple UL-CG configurations.

In a twenty-sixth aspect alternatively or in addition to one or more of the first through twenty-fifth aspects, the UL-CG configuration indicates a priority associated with the UL-CG, the priority indicating whether the UL-CG has precedence to the second resources.

In a twenty-seventh aspect alternatively or in addition to one or more of the first through twenty-sixth aspects, the priority is indicated by one or more of a dedicated field or a priority flag.

In a twenty-eighth aspect alternatively or in addition to one or more of the first through twenty-seventh aspects, the receiver is further configured to receive a preemption signal indicating that the second resources are preempted from use for the UL-CG during the slot.

In a twenty-ninth aspect alternatively or in addition to one or more of the first through twenty-eighth aspects, the UE is further configured to transmit during the occasion of the UL-CG using the second resources by default during the slot unless the UE receives the preemption signal.

In a thirtieth aspect alternatively or in addition to one or more of the first through twenty-ninth aspects, a method of wireless communication includes receiving, by a user equipment (UE), an uplink configured grant (UL-CG) having an UL-CG configuration associated with first resources. An occasion of the UL-CG is to occur during a slot. The method further includes receiving, by the UE, a message indicating modification of resources associated with the slot from a half-duplex (HD) resource configuration to a sub-band full-duplex (SBFD) resource configuration that includes second resources associated with a downlink transmission or with a guard band. The method further includes, based on determining that the first resources and the second resources include one or more common resources, performing, by the UE, one or more operations associated with a resource configuration of the slot.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, devices, circuits, and operations described in connection with the disclosure herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions may be combined or performed in ways other than those illustrated and described herein.

The various illustrative logical blocks, devices, circuits, and operations described in connection with the implementations disclosed herein may be implemented using electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, a data processing apparatus.

If implemented in software, the functions may be stored as one or more instructions or code on a computer-readable medium. The operations of a method or process disclosed herein may be implemented in a processor-executable software module, which may reside on a computer-readable medium. A computer-readable medium may include any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

It should be understood that the above examples are not necessarily intended to limit claimed subject matter. For example, unless specifically recited, claimed subject matter relating to wireless communications is not necessarily intended to be limited to any particular author/entity defined frequency band, or the like.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus for wireless communication, the apparatus comprising:
a receiver configured to receive a plurality of uplink configured grant (UL-CG) configurations and to receive an UL-CG, the plurality of UL-CG configurations including a UL-CG configuration associated with a half-duplex (HD) resource configuration and further including another UL-CG configuration associated with a sub-band full-duplex (SBFD) resource configuration; and
a transmitter configured to perform, based on an UL-CG configuration of the plurality of UL-CG configurations, an uplink transmission during an occasion of the UL-CG, wherein the occasion occurs during a slot, and wherein the UL-CG configuration is selected from among the plurality of UL-CG configurations based on a resource configuration associated with the slot.

2. The apparatus of claim 1, wherein the resource configuration corresponds to an SBFD resource configuration, and wherein the UL-CG configuration corresponds to the UL-CG configuration associated with a HD resource configuration.

3. The apparatus of claim 1, wherein the resource configuration corresponds to an HD resource configuration, and wherein the UL-CG configuration corresponds to the another UL-CG configuration associated with a SBFD resource configuration.

4. The apparatus of claim 1, wherein the receiver is further configured to:
receive a first configuration message indicating that a first UL-CG configuration of the plurality of UL-CG configurations is associated with a first set of slots based on a periodicity value and with a second set of slots based on the periodicity value; and
receive a second configuration message indicating that a second UL-CG configuration of the plurality of UL-CG configurations is associated with a third set of slots based on the periodicity value.

5. The apparatus of claim 1, wherein the receiver is further configured to:
receive a first configuration message indicating that a first UL-CG configuration of the plurality of UL-CG configurations is associated with a first set of slots based on a periodicity value;
receive a second configuration message indicating that a second UL-CG configuration of the plurality of UL-CG configurations is associated with a second set of slots based on the periodicity value; and
receive a third configuration message indicating that a third UL-CG configuration of the plurality of UL-CG configurations is associated with a third set of slots based on the periodicity value.

6. The apparatus of claim 1, wherein the receiver is further configured to receive a message modifying a particular slot format of the slot.

7. The apparatus of claim 6, wherein the message indicates modification of the particular slot format from a half-duplex (HD) resource configuration to a sub-band full-duplex (SBFD) resource configuration.

8. The apparatus of claim 6, wherein one or more of the plurality of UL-CG configurations are associated with respective a slot offset of the particular slot format and with a respective slot periodicity of the particular slot format.

9. The apparatus of claim 6, wherein the plurality of UL-CG configurations are not associated with an uplink bandwidth (UL BW) or with an uplink bandwidth part (UL BWP) index, and wherein the plurality of UL-CG configurations are independent of the particular slot format and are applicable to the slot independently of the particular slot format.

10. The apparatus of claim 9, wherein the particular slot format indicates one or more uplink resources that are associated with the UL-CG configuration, and wherein the transmitter is further configured to perform a physical uplink shared channel (PUSCH) transmission using the one or more uplink resources.

11. The apparatus of claim 10, wherein at least some of the plurality of UL-CG configurations are associated with a priority scheme, and wherein the UL-CG is selected for the PUSCH transmission based on a priority ranking of the UL-CG within the priority scheme.

12. The apparatus of claim 11, wherein each UL-CG configuration of the plurality of UL-CG configurations is associated with a respective particular priority ranking of the priority scheme irrespective of whether the UL-CG configuration is associated with a common resource as a downlink channel or a guard band.

13. The apparatus of claim 11, wherein the at least some of the plurality of UL-CG configurations correspond to UL-CG configurations that are not associated with a common resource as a downlink channel or a guard band.

14. The apparatus of claim 9, wherein the transmitter is further configured to skip one or more resources of the UL-CG configuration based on a determination that at least one resource associated with the UL-CG configuration is further associated with a downlink channel or a guard band.

15. The apparatus of claim 9, wherein the receiver is further configured to receive an indication of the particular slot format.

16. The apparatus of claim 15, wherein the indication includes a slot format indicator (SFI) indicating the particular slot format.

17. The apparatus of claim 1, wherein each UL-CG configuration of the plurality of UL-CG configurations is associated with one or more of a respective uplink bandwidth (UL BW) or a respective uplink bandwidth part (UL BWP) index.

18. The apparatus of claim 17, wherein the plurality of UL-CG configurations include at least one UL-CG configuration for non-duplex uplink slots, and wherein the plurality of UL-CG configurations further include at least one other UL-CG configuration for full duplex slots that are associated with one or more particular UL BWs and with one or more particular UL BWPs.

19. A method of wireless communication, the method comprising:
receiving, by a user equipment (UE), a plurality of uplink configured grant (UL-CG) configurations, the plurality of UL-CG configurations including a UL-CG configuration associated with a half-duplex (HD) resource configuration and further including another UL-CG configuration associated with a sub-band full-duplex (SBFD) resource configuration;
receiving, by the UE, an UL-CG;
based on a resource configuration associated with a slot, selecting, by the UE, an UL-CG configuration from among the plurality of UL-CG configurations for an occasion of the UL-CG that is to occur during the slot; and
performing an uplink transmission during the occasion of the UL-CG based on the selected UL-CG configuration.

20. A user equipment (UE) for wireless communication, the UE comprising:
a transmitter; and
a receiver configured to receive an uplink configured grant (UL-CG) having an UL-CG configuration associated with first resources, wherein an occasion of the UL-CG is to occur during a slot, wherein the receiver is further configured to receive a message indicating modification of resources associated with the slot from a half-duplex (HD) resource configuration to a sub-band full-duplex (SBFD) resource configuration that includes second resources associated with a downlink transmission or with a guard band, and
wherein the UE is configured to perform, based on determining that the first resources and the second resources include one or more common resources, one or more operations associated with a resource configuration of the slot.

21. The UE of claim 20, wherein the one or more operations include determining an error associated with the slot.

22. The UE of claim 20, wherein the one or more operations include determining to skip the occasion of the UL-CG during the slot based on the one or more common resources.

23. The UE of claim 22, wherein the transmitter is configured to perform a physical uplink shared channel (PUSCH) transmission during the slot using one or more third resources that are not included in the second resources.

24. The UE of claim 23, wherein the one or more third resources are associated with a particular UL-CG configuration of multiple UL-CG configurations, and wherein the UE is further configured to select the particular UL-CG configuration for the PUSCH transmission based on a comparison of index values associated with the multiple UL-CG configurations or based on a priority scheme associated with the multiple UL-CG configurations.

25. The UE of claim 20, wherein the UL-CG configuration indicates a priority associated with the UL-CG, the priority indicating whether the UL-CG has precedence to the second resources.

26. The UE of claim 25, wherein the priority is indicated by one or more of a dedicated field or a priority flag.

27. The UE of claim 20, wherein the receiver is further configured to receive a preemption signal indicating that the second resources are preempted from use for the UL-CG during the slot.

28. The UE of claim 27, wherein the UE is further configured to transmit during the occasion of the UL-CG using the second resources by default during the slot unless the UE receives the preemption signal.

29. A method of wireless communication, the method comprising:
receiving, by a user equipment (UE), an uplink configured grant (UL-CG) having an UL-CG configuration associated with first resources, wherein an occasion of the UL-CG is to occur during a slot;
receiving, by the UE, a message indicating modification of resources associated with the slot from a half-duplex (HD) resource configuration to a sub-band full-duplex (SBFD) resource configuration that includes second resources associated with a downlink transmission or with a guard band; and
based on determining that the first resources and the second resources include one or more common resources, performing, by the UE, one or more operations associated with a resource configuration of the slot.

* * * * *